(12) United States Patent
Ben Abdelaziz

(10) Patent No.: US 10,316,554 B2
(45) Date of Patent: Jun. 11, 2019

(54) OPENING SYSTEM FOR A VEHICLE

(71) Applicant: Faurecia Interieur Industrie, Nanterre (FR)

(72) Inventor: Omar Ben Abdelaziz, Beauvais (FR)

(73) Assignee: FAURECIA INTERIEUR INDUSTRIE, Nanterre (FR)

(*) Notice: Subject to any disclaimer, the term of this patent is extended or adjusted under 35 U.S.C. 154(b) by 209 days.

(21) Appl. No.: 14/839,197

(22) Filed: Aug. 28, 2015

(65) Prior Publication Data

US 2016/0060910 A1 Mar. 3, 2016

(30) Foreign Application Priority Data

Aug. 28, 2014 (FR) ...................... 14 58061

(51) Int. Cl.
| | | |
|---|---|---|
| *B60R 7/06* | (2006.01) | |
| *E05C 1/06* | (2006.01) | |
| *E05B 17/10* | (2006.01) | |
| *E05B 17/22* | (2006.01) | |
| *E05B 41/00* | (2006.01) | |
| *E05B 47/00* | (2006.01) | |
| *E05B 63/00* | (2006.01) | |

(Continued)

(52) U.S. Cl.
CPC .............. *E05B 81/70* (2013.01); *B60R 7/06* (2013.01); *E05B 83/30* (2013.01); *E05C 17/56* (2013.01); *E05C 19/166* (2013.01); *E05B 17/10* (2013.01); *E05B 17/22* (2013.01); *E05B 41/00* (2013.01); *E05B 63/0017* (2013.01); *E05B 2047/0058* (2013.01); *E05C 1/06* (2013.01); *Y10T 292/1022* (2015.04); *Y10T 292/11* (2015.04)

(58) Field of Classification Search
CPC .......... E05B 41/00; E05B 17/10; E05B 17/22; E05B 63/0017; E05B 2047/0058; E05C 1/06; Y10T 292/1022; B60R 7/06
USPC .......... 292/251.5, DIG. 65; 296/37.12, 97.22
See application file for complete search history.

(56) References Cited

U.S. PATENT DOCUMENTS 2,584,480 A * 2/1952 Manting ............... E05C 19/166
109/63.5
2,791,346 A * 5/1957 Tell ........................ B60N 3/083
131/241

(Continued)

OTHER PUBLICATIONS

FR Search Report for application No. FR1458061 dated May 13, 2015, 7 pages.

*Primary Examiner* — Kristina R Fulton
*Assistant Examiner* — Faria F Ahmad
(74) *Attorney, Agent, or Firm* — Reising Ethington P.C.

(57) ABSTRACT

An opening system for a vehicle includes a frame having an opening, an opening member that is movable relative to the frame between a closed position and an open position, and a retaining device. The retaining device includes a ferromagnetic element provided on the opening member, a magnet provided on the frame and magnetically coupled to the ferromagnetic element when the opening member is in the closed position, an electromagnet coupled to the magnet, and a control unit having a control module that controls the electromagnet upon reception of a control command. The control unit includes a detection module which, in the absence of a control command being received by the control module, is enabled for the detection of a signal, originating from the electromagnet, representative of the opening member reaching the closed position.

13 Claims, 4 Drawing Sheets

(51) Int. Cl.
    *E05B 81/70*     (2014.01)
    *E05B 83/30*     (2014.01)
    *E05C 17/56*     (2006.01)
    *E05C 19/16*     (2006.01)

(56) References Cited

U.S. PATENT DOCUMENTS

| | | | | |
|---|---|---|---|---|
| 3,468,576 | A * | 9/1969 | Beyer | E05C 19/16 |
| | | | | 220/230 |
| 7,121,605 | B2 * | 10/2006 | DePue | E05B 83/30 |
| | | | | 296/37.12 |
| 7,240,941 | B2 * | 7/2007 | Adams | B60R 7/06 |
| | | | | 296/37.1 |
| 7,500,704 | B2 * | 3/2009 | Herrera | B60R 7/06 |
| | | | | 296/37.12 |
| 7,583,500 | B2 * | 9/2009 | Ligtenberg | G06F 1/1616 |
| | | | | 361/147 |
| 8,215,684 | B2 * | 7/2012 | Whitens | B60R 7/06 |
| | | | | 292/251.5 |
| 8,720,968 | B2 * | 5/2014 | Zalan | E05B 83/34 |
| | | | | 292/251.5 |
| 9,566,912 | B2 * | 2/2017 | Shami | B60R 7/06 |
| 2005/0206182 | A1 * | 9/2005 | DePue | E05B 83/30 |
| | | | | 296/37.12 |
| 2009/0173119 | A1 | 7/2009 | Hunt et al. | |
| 2010/0071424 | A1 | 3/2010 | Tsuruta | |
| 2011/0175376 | A1 * | 7/2011 | Whitens | B60R 7/06 |
| | | | | 292/251.5 |
| 2012/0267958 | A1 * | 10/2012 | Hou | H02J 9/005 |
| | | | | 307/80 |

\* cited by examiner

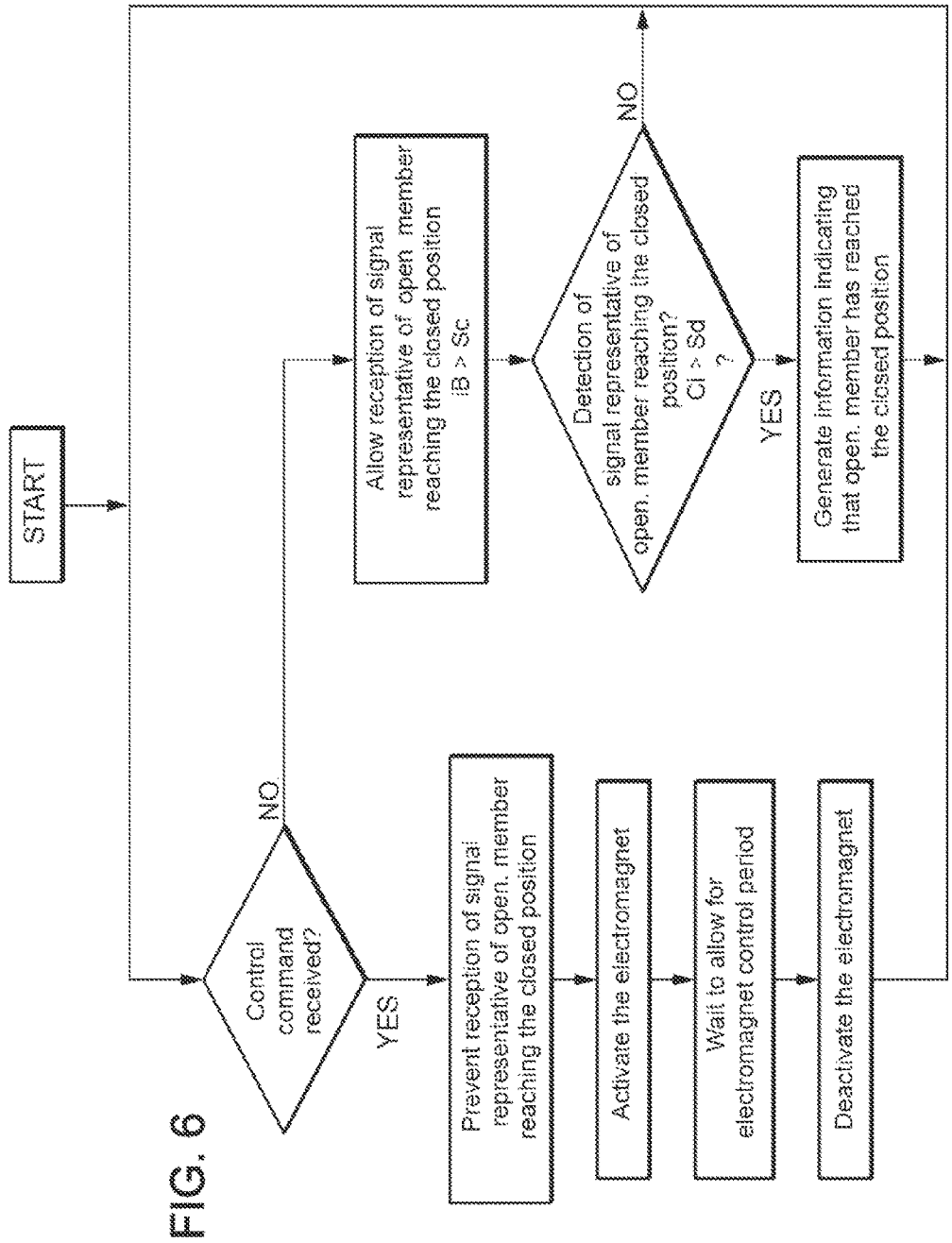

OPENING SYSTEM FOR A VEHICLE

FIELD OF THE DISCLOSURE

The present invention relates to an opening system for a vehicle, particularly for a motor vehicle. More specifically, the invention relates to an opening system for a vehicle, comprising:
- a frame having an opening;
- an opening member that is movable relative to the frame between a closed position where it obstructs the opening of said frame and an open position where it unobstructs the opening of said frame; and
- a retaining device comprising:
  - a ferromagnetic element provided on one of the frame and opening member;
  - a permanent magnet provided on the other of the frame and opening member and magnetically coupled to the ferromagnetic element when the opening member is in the closed position so as to apply a closure force;
  - an electromagnet magnetically coupled to one of the ferromagnetic element and permanent magnet; and
  - a control unit comprising a control module electrically coupled to the electromagnet and adapted to control the electromagnet upon reception of a control command.

BACKGROUND OF THE DISCLOSURE

Document U.S. Pat. No. 8,215,684 discloses an opening system of this type, implemented in a storage compartment located in the passenger compartment of a motor vehicle and comprising a housing, forming a frame, and a closing flap that pivots relative to the housing and forms a door.

In that document, when the closing flap is in the closed position relative to the housing of the storage compartment, actuation of a pushbutton controls for a predetermined duration, causes the electromagnet to magnetically couple to the ferromagnetic element, which breaks the magnetic attraction between the ferromagnetic element provided on the housing of the storage compartment and the magnets provided on the closing flap. The flap can then be moved to a position which exposes the opening of the housing, for example by an opening action performed by an occupant of the vehicle or by gravity.

When the vehicle occupant wishes to close the storage compartment, he or she acts directly on the flap to return it to the closed position on the housing. As control of the electromagnet is no longer effective, the flap is now held in the closed position on the housing by the closure force generated by magnetic cooperation between the ferromagnetic element of the housing and the magnets on the flap.

In the system described in document U.S. Pat. No. 8,215,684, nothing is provided for detecting such a closing action performed by a vehicle occupant on the storage compartment. Detection of this information, and in particular the arrival of the flap in the closed position on the housing, may be particularly useful, for example for controlling the extinguishing of a storage compartment lighting device or activating a storage compartment cooling device.

More generally, detecting that an opening member has reached its closed position on a frame can be useful for controlling equipment whose operation is affected by this information.

Many devices exist in the prior art for detecting that an opening member has reached its closed position on a frame. These devices make use of sensors such as mechanical switches, optical sensors, or Hall effect sensors.

However, implementation of such a sensor device in an opening system represents a significant cost and poses problems in terms of: physical integration with the opening system, as the sensor device occupies a certain volume and the space available within the opening system may be limited; the limited service life of the sensor device which then may need to be replaced; or the complexity of the wiring.

OBJECTS AND SUMMARY OF THE DISCLOSURE

The present invention aims to alleviate some or all of these disadvantages by providing an opening system in which the arrival of the opening member in the closed position on the frame can be detected without using a sensor device.

For this purpose, the present invention in at least some embodiments provides an opening system of the aforementioned type, wherein the control unit further comprises a detection module which, in the absence of a control command being received by the control module, is enabled for the detection of a signal, originating from the electromagnet, representative of the opening member reaching the closed position, and for generating information indicating that the opening member is in the closed position.

With these arrangements, the opening system for a vehicle is capable of detecting that the opening member has reached the closed position on the frame, and of generating information indicating this arrival without requiring any sensor device, by using a signal issuing directly from the electromagnet and characteristic of the opening member reaching the closed position on the frame.

This opening system thus provides many advantages, particularly in terms of ease of integration, service life, reliability, or cost.

Such an opening system can have numerous applications within a motor vehicle. In particular, such an opening system can be integrated into a storage compartment system inside or outside the passenger compartment of the vehicle, a fuel cap system, a hood system, a sliding roof system, or some other system.

In at least one embodiment of the invention, the detection module is adapted to receive a current induced in the electromagnet by the magnetic field variation caused by the change in position between the ferromagnetic element and the permanent magnet when the opening member is moved between the open position and the closed position, and the detection module detects a signal representative of the opening member reaching the closed position and generates information indicating that the opening member is in the closed position when said induced current reaches a predetermined detection threshold.

When the opening member is moved relative to the frame, the distance changes between the ferromagnetic element associated with one of the opening member and the frame, and the magnet associated with the other of the opening member and frame. When the opening member approaches the closed position on the frame, the change of position of the opening member relative to the frame, and therefore of the ferromagnetic element relative to the magnet, causes a variation in the magnetic field between these two elements. Such a magnetic field variation results in the generation of induced current in the electromagnet associated with one or the other among the ferromagnetic element and the magnet.

In the opening system for a vehicle according to this embodiment, an induced current threshold, characteristic of the opening member reaching the closed position and in this case characteristic of the ferromagnetic element coming in contact with the magnet, is defined by taking into account the physical properties of the electromagnet, the ferromagnetic element, and the magnet.

When the detection module of the control unit is activated, said detection module monitors the current induced in the electromagnet and determines that the opening member has reached the closed position of the opening member when the current induced in the electromagnet exceeds this characteristic induced current threshold.

In certain embodiments of the invention, one or more of the following arrangements may possibly be used:

the opening system further comprises a switching element electrically connected to the electromagnet and detection module and adapted to adopt an open state in which the electromagnet is electrically insulated from the detection module, upon reception of a control command by the control module, and to adopt an on state in which the electromagnet is electrically connected to the detection module in the absence of a control command being received by the control module;

the control module comprises a detection control port adapted to send a detection control signal, and the detection module comprises a receiving port for the induced current,
the switching element is electrically connected to the detection control port,
the switching element is adapted to adopt the open state as long as the detection control signal sent to the detection control port is below a predetermined control threshold, and to adopt the on state when the detection control signal sent to the detection control port exceeds said predetermined control threshold,
and the control module sends to the detection control port a detection control signal exceeding the predetermined control threshold in the absence of a control command being received by the control module;

the switching element comprises an NPN transistor having a base, a collector, and an emitter, said base being connected to the control port, said collector being connected to the electromagnet, and said emitter being connected to the detection port;

the electromagnet is magnetically coupled to the permanent magnet and, after receiving an open command, the control module supplies electricity to the electromagnet such that the magnetic field impinging on the ferromagnetic element from the permanent magnet is at least partially cancelled by the magnetic field from the electromagnet, thereby at least partially cancelling the closure force applied to the opening member. With this arrangement, the electrical energy required to allow the opening member to disengage from the frame opening is reduced and essentially depends on the strength of the magnet used in the opening member system.

the electromagnet is magnetically coupled to the ferromagnetic element and, after receiving an open command, the control module supplies electricity to the electromagnet to magnetically polarize the ferromagnetic element, such that an opening force opposing and exceeding the closure force is applied to the opening member. With this arrangement, the opening system provides assistance in moving the opening member to the open position after an open command is received by the control module.

upon receiving an open command, the control module supplies electricity to the electromagnet for a predetermined period of time;

the opening system further comprises a release control button operable by a vehicle occupant and electrically connected to the control module such that the open command is sent to said control module upon actuation of the release control button by a vehicle occupant;

after receiving a lock command, the control module supplies electricity to the electromagnet so as to reinforce the closure force applied to the opening member. With these arrangements, it is possible in particular situations, for example in a collision of the vehicle with an obstacle, to strengthen the closure force retaining the opening member in the closed position relative to the frame in order to reduce the risk of an undesirable opening of the opening system under these particular conditions;

the opening system further comprises an event detection device adapted to detect an event and electrically connected to the control module so that the lock command is sent to said control module upon detection of an event by the event detection device;

the event detection device comprises a crash sensor, a rain sensor, a light sensor, and/or a proximity sensor.

The invention also relates to a method for detecting that an opening member has reached the closed position on a frame in an opening system as defined above, comprising the following successive steps:

verification of reception of a control command by the control module of the control unit;

in the absence of a control command being received by the control module, activation of the detection module;

detection of a signal, originating from the electromagnet, representative of the opening member reaching the closed position; and generation of information indicating that the opening member is in the closed position.

In an advantageous arrangement of the detection method, the step of detection of a signal, originating from the electromagnet, representative of the opening member reaching the closed position comprises the following sub-steps:

reception in the detection module of a current induced in the electromagnet by the magnetic field variation caused by the change in position between the ferromagnetic element and the magnet when the opening member is moved between the open position and the closed position;

comparison of the induced current with a predetermined detection threshold;

detection of a signal representative of the opening member reaching the closed position when the induced current reaches the predetermined detection threshold; and generation of information indicating that the opening member is in the closed position.

Advantageously, the activation step of the detection module lies in the switching of a switching element electrically connected to the electromagnet and detection module, from an open state in which the electromagnet is electrically insulated from the detection module to an on state in which the electromagnet is electrically connected to the detection module.

BRIEF DESCRIPTION OF THE DRAWINGS

Other features and advantages of the invention will become apparent from the following description of one of its embodiments, given by way of non-limiting example with reference to the accompanying drawings.

In the drawings:

FIG. 6 is a flowchart illustrating operation of the opening system of FIG. 2.

In the various figures, the same references designate identical or similar elements.

DETAILED DESCRIPTION

Figure 1:
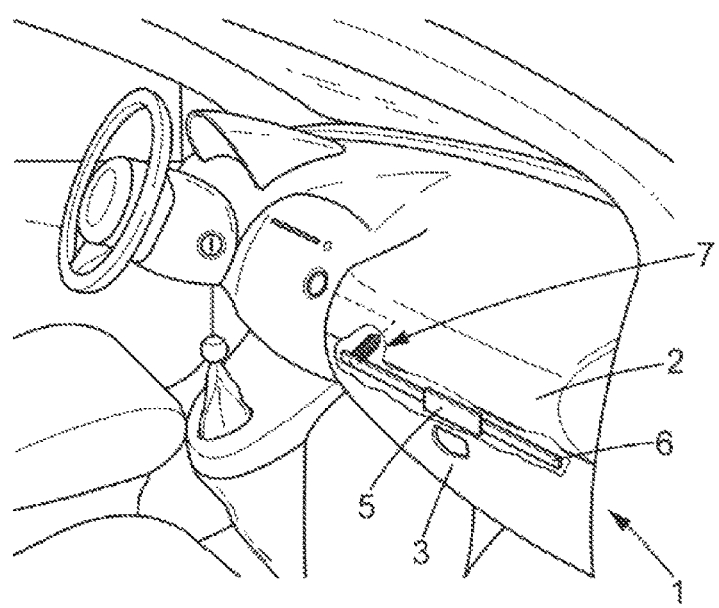
FIG. 1 is a schematic view of a vehicle passenger compartment equipped with an opening system according to an embodiment of the invention, applied to a storage compartment.

In FIG. 1, a passenger compartment of a motor vehicle is represented, equipped with a storage compartment implementing an opening system 1 according to an exemplary embodiment of the invention.

Figure 2:
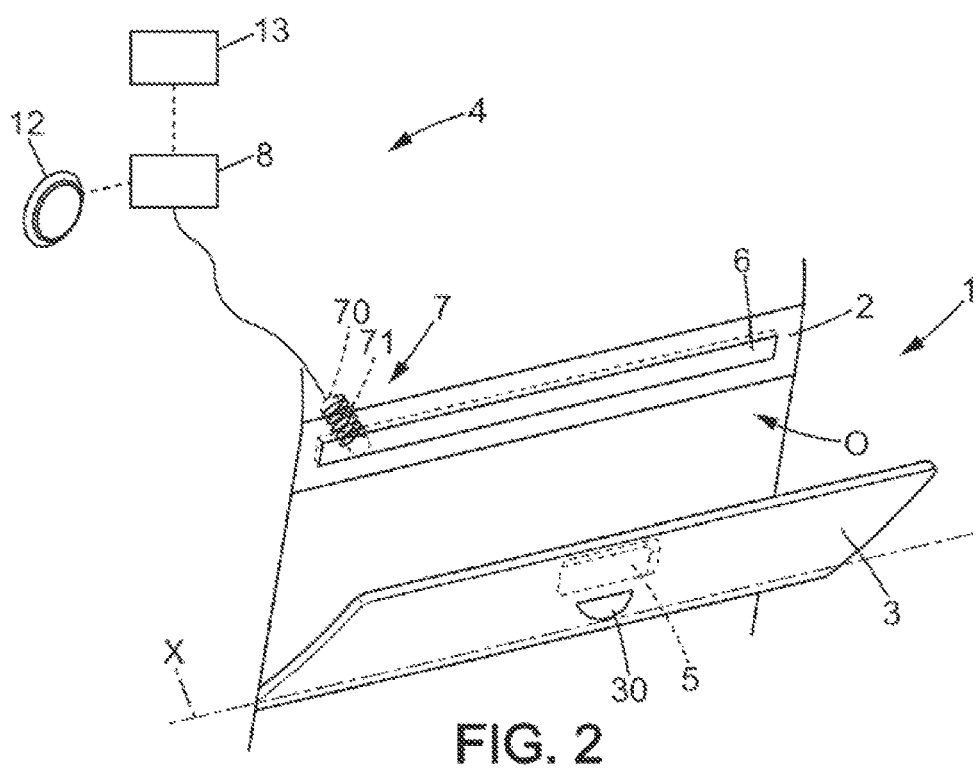
FIG. 2 is a schematic perspective view of an opening system according to an embodiment of the invention, applied to a storage compartment inside a vehicle passenger compartment.

As can be seen in FIGS. 1 and 2, the storage compartment 1 comprises a frame 2 having an opening O and part of a housing 20 defining an internal storage space of the storage compartment 1.

Figure 3:
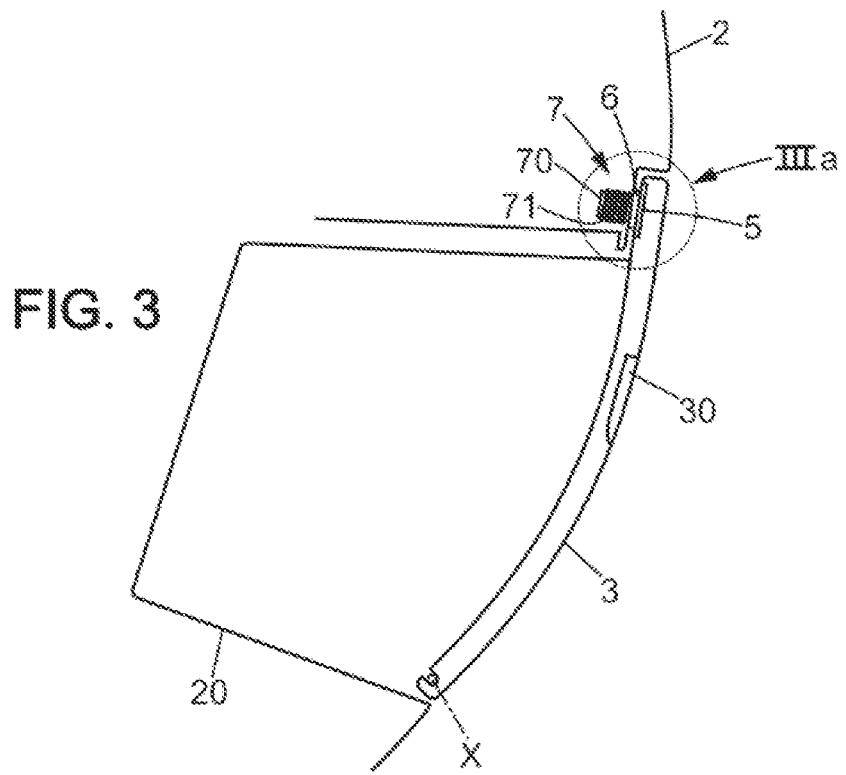
FIG. 3 is a side view of the opening system of FIG. 2, in which the opening member is in the closed position on the frame.
Figure 3A:
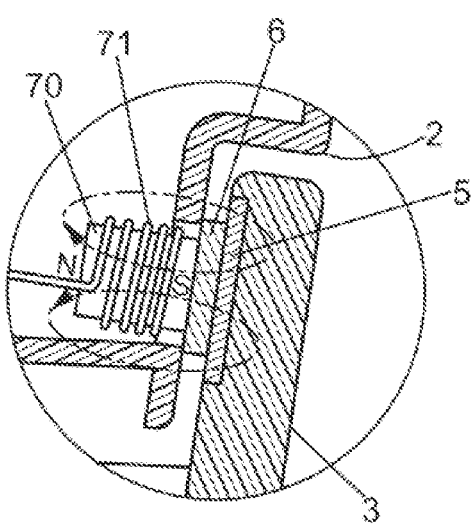
FIG. 3a shows a detailed view of FIG. 3 to illustrate a portion of the device retaining the opening member in the closed position on the frame.
Figure 4:
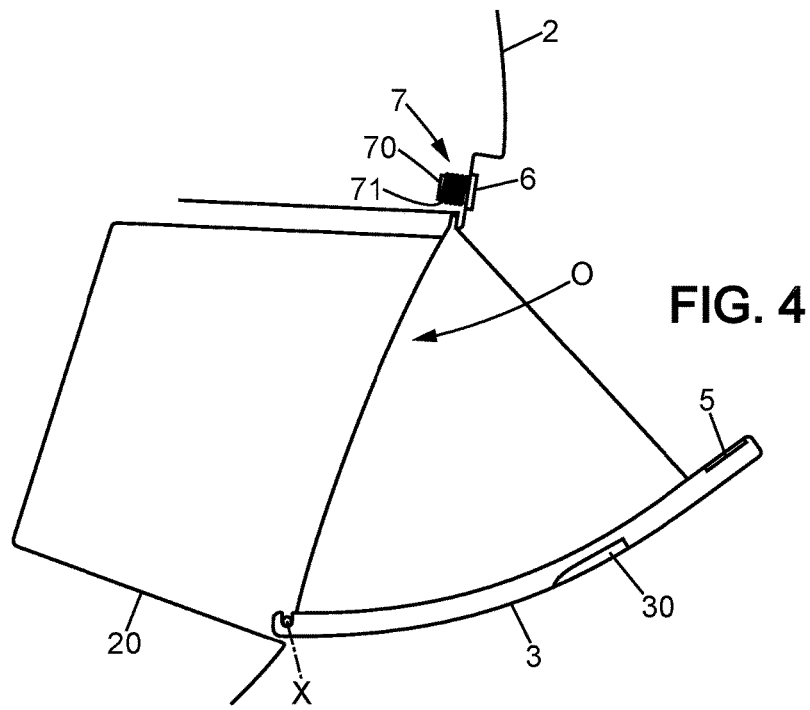
FIG. 4 is a side view of the opening system of FIG. 2, in which the opening member is in the open position on the frame.

The storage compartment 1 comprises an opening member 3 that is movable relative to the frame 2 between a closed position, illustrated in FIG. 3, where the opening member 3 obstructs the opening O of the frame 2 and prevents access to the internal storage space, and an open position, illustrated in FIGS. 2 and 4, where the opening member 3 unobstructs the opening O of the frame 2 and allows access to the internal space of the storage compartment 1.

In the embodiment illustrated in FIGS. 1 to 4, the opening member 3 is movable relative to the frame 2 by pivoting about a pivot axis X. However, the invention also applies to any other kinematics of an opening member relative to a frame, such as translational, combination of rotational and translational, or other.

The storage compartment 1 further comprises a retaining device 4 for retaining the opening member 3 in the closed position on the frame 2 and for releasing the opening member 3 so that it can be moved to an open position on the frame 2 after receiving an open command.

In the embodiment illustrated in the figures, the retaining device 4 comprises a ferromagnetic element 5 provided on the opening member 3, a permanent magnet 6 provided on the frame 2, and an electromagnet 7 provided on the frame 2 and magnetically coupled to the permanent magnet 6.

The permanent magnet 6 provided on the frame 2 and the ferromagnetic element 5 provided on the opening member 3 are magnetically coupled, in other words cooperate by magnetic coupling, when the opening member 3 is in the closed position on the frame 2 so as to generate a closure force holding the opening member 3 in the closed position on the frame 2.

Figure 5:
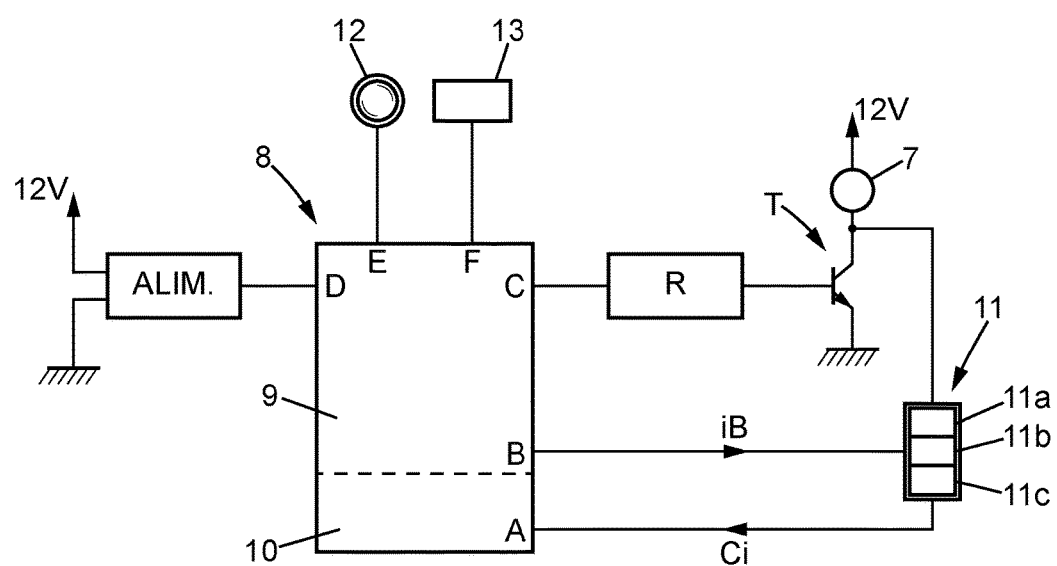
FIG. 5 is a schematic view illustrating an exemplary control circuit for the control unit of the opening system of FIG. 2.

The retaining device 4 comprises a control unit 8. As can be seen in FIG. 5, the control unit 8 comprises a control module 9 electrically coupled to the electromagnet 7 and adapted to control the electromagnet 7 after reception of a control command.

Such a control command sent to the control module 9 may be an open command issued upon actuation by a vehicle occupant of a release control button 12 arranged in the passenger compartment as can be seen for example in FIG. 1.

In the embodiment shown in the figures, the electromagnet 7, comprising a cylindrical core 70 and coils 71 wound around the core 70, is magnetically associated with the permanent magnet 6. In this case, following reception of an open command transmitted upon actuation of the release control button 12, the control module 9 supplies power to the electromagnet 7, preferably for a predetermined period of time, so as to demagnetize the permanent magnet 6 which eliminates the closure force applied to the opening member 3.

During this predetermined period of time, the opening member 3 is no longer retained in the closed position on the frame by the retaining device 4 and may move independently to an open position on the frame 2, for example by gravity or by the expansion of an elastic member such as a spring which is compressed when the opening member 3 is in the closed position on the frame 2, or may move with the assistance of a vehicle occupant acting directly on the opening member 3, for example by inserting fingers in a recess 30 provided in the opening member 3 for this purpose.

Alternatively, and without departing from the scope of the invention, the electromagnet 7 may be magnetically coupled to the ferromagnetic element 5. In this case, it is advantageous if, following the reception of an open command transmitted upon actuation of the release control button 12, the control module 9 supplies power to the electromagnet 7, preferably for a predetermined period of time, to polarize the ferromagnetic element 5 so that an opening force opposing and exceeding the closure force is applied to the opening member 3.

More specifically, in such an embodiment the control module 9 supplies power to the electromagnet 7 so that the electromagnet generates a magnetic field polarizing the ferromagnetic element 5 with the same polarity as the contact surface of the permanent magnet 6. Thus, as the ferromagnetic element 5 and the permanent magnet 6 have the same polarity, north or south, magnetic repulsion is created between these two elements. The ferromagnetic element 5, the permanent magnet 6, the electromagnet 7, and the current supplied by the control module 9 to the electromagnet 7 are advantageously chosen so that this repulsion constitutes an opening force opposing and exceeding the closure force.

Furthermore, upon reception of a lock command, the control module 9 may also supply electricity to the electromagnet 7 in order to strengthen the closure force applied to the opening member.

Thus, another control command sent to the control module 9 can be a lock command issued upon detection of an event by an event detection device 13 provided in the vehicle and electrically connected to the control module 9.

In the exemplary embodiment of the invention illustrated in the figures, the opening system is part of a storage compartment 1 inside the passenger compartment of the vehicle. In this exemplary application of the invention, the event detection device may be a crash sensor adapted to detect the collision of the vehicle it equips with an obstacle. In case of collision, the impact to the vehicle is likely to cause unintentional opening of the opening member 3 being retained in the closed position by the magnetic cooperation of the ferromagnetic element 5 and the magnet 6. In such a situation it may be necessary to apply a reinforced closure force to the opening member 3 in order to prevent unintentional opening of the opening member 3.

Alternatively, and depending on the vehicle system in which the opening system is implemented, the event detection device may be a rain sensor, a light sensor, or a proximity sensor.

The operation and control of the electromagnet 7 by the control module 9 of the control unit 8 upon reception of a control command, whether an open command or a lock command, are known from said document U.S. Pat. No. 8,215,684 and will not be described here in more detail.

The control unit 8 further comprises a detection module 10 which, when enabled, detects a signal originating from the electromagnet 7 and representative of the opening member 3 reaching the closed position on the frame 2, following movement of the opening member 3 between the open position and the closed position by a vehicle occupant. When such a signal is detected by the detection module 10, the module generates information indicating that the opening member 3 is in the closed position on the frame 2.

This information is intended to be used, for example, in a context where a device is controlled based on the arrival of the opening member 3 in the closed position, for example switching off a lighting device or activating a cooling device in a context where the opening system is applied to a storage compartment.

The detection module 10 is intended to be activated in the absence of a control command being received by the control module 9. In other words, the detection module is enabled as long as the control module does not receive a control command originating, for example, from the control button 12 or the event detection device 13 as seen above.

Thus, in the absence of a control command being received by the control module 9, the detection module 10 monitors for a signal originating from the electromagnet 7, characteristic of the opening member 3 reaching the closed position on the frame 2 following movement of the opening member 3 between the open position and the closed position by a vehicle occupant.

More specifically, when the electromagnet 7 is not so controlled by the control module 9, the electromagnet is in a passive state and the detection module 10 is enabled for receiving and monitoring a current induced in the electromagnet 7, and more specifically in the coils 71 of the electromagnet 7, by the magnetic field variation caused by the change in position between the ferromagnetic element 5 and the permanent magnet 6 when the opening member 3 is moved between the open position and the closed position.

The electromagnet 7 is thus used as a sensor, with the detection module 10 monitoring the induced current traveling through it when the opening member 3 is moved between the open position and the closed position.

When the opening member 3 is in or near the open position and a vehicle occupant begins to move it to the closed position, the magnetic field variation and the resulting current induced in the electromagnet are weak, with these two parameters increasing as the opening member approaches the closed position.

The detection module 10 is designed to monitor the current induced in the electromagnet 7 and to conclude that the opening member 3 has reached the closed position on the frame 2, in other words to detect a signal representative of the opening member 3 reaching the closed position, when the current induced in the electromagnet 7 exceeds a predetermined detection threshold Sd.

This detection threshold Sd is suitably chosen in particular according to the characteristics of the electromagnet 7, the ferromagnetic element 5, and the magnet 6, and substantially corresponds to the current induced in the electromagnet 7 when the opening member 3 is moved from a position near the closed position to the closed position.

Referring to FIG. 5, we will now describe an example of the control circuit for the control unit 8 of the opening system 1.

In this FIG. 5, the control unit 8 is in the form of a circuit board comprising a plurality of ports A, B, C, D, E, F. Port A is part of the detection module 10 and is a receiving port whose usefulness will be described below. Port B is part of the control module 9 and is a detection control port whose usefulness will be described below. Port C is part of the control module 9, is electrically connected to the electromagnet 7, and constitutes a control port of the electromagnet 7 by means of which a control current, going in one direction in the case of an open command received by the control module 9 and in the opposite direction in the case of a lock command received by the control module 9, is sent to the electromagnet 7 via a resistor R and a switching transistor. Port D is part of the control module 9 and is connected to a power source PWR. Port E and port F are part of the control module 9 and are electrically connected to the release control button 12 and the event detection device 13.

As is also visible in FIG. 5, the opening system further comprises a switching element 11 electrically connected to the electromagnet 7 and detection module 10, and capable of adopting an open state in which the electromagnet 7 is isolated, meaning that is not electrically connected to the detection module 10, and an on state in which the electromagnet 7 is electrically connected to the detection module 10. As seen above, the detection module 10 is only enabled when no control command is received by the control unit 9. The switching element 11 is intended to adopt the on state as long as no control command is received by the control module 9 and to adopt the open state when the control module receives a control command.

Such a switching element may take the form of a simple controlled switch. In the embodiment illustrated in FIG. 5, the switching element is in the form of an NPN transistor 11 having a base 11a, a collector 11b, and an emitter 11c. The base 11a is connected to the detection control port B of the control module 9, the collector 11b is connected to the electromagnet 7, and the emitter 11c is connected to the detection port A of the detection module 10.

The transistor 11 is used here in switching. When a control command is received by the control module 9, the control module 9 controls the electromagnet 7 through the control port C, and no current is supplied by the control module 9 to the detection control port B so that the transistor adopts the open state.

When no control command is received by the control module 9, a detection control signal is sent to the detection control port B of the control module 9. In order for the transistor 11 to adopt the on state, the detection control signal sent to the detection control port B and received by the base of the transistor 11 must exceed a predetermined control threshold Sc, corresponding to the saturation limit of the transistor 11.

As mentioned above, in the embodiment illustrated in FIG. 5, the emitter of the transistor is connected to the detection port A of the detection module 10. Thus, when no control command is received by the control module 9 and the transistor 11 is in the on state, current can flow between the collector of the transistor 11 connected to the electromagnet 7 and the emitter of the transistor 11 connected to the receiving port A of the detection module. In particular, under these conditions a current Ci induced in the electromagnet 7, caused by the magnetic field variation between the ferromagnetic element 5 and the magnet 6 when the opening member 3 is moved between the open position and closed position, is received at the receiving port A of the detection module. The detection module 10 is designed to conclude that the opening member has reached the closed position on the frame, in other words to detect a signal representative of the opening member reaching the closed position, when this induced current exceeds a predetermined detection threshold Sd defined by taking into account the physical properties of the electromagnet, ferromagnetic element, and magnet.

When a control command is received by the control module 9, no signal or at least no signal above the predetermined control threshold Sc is sent to the detection control port B, so that the transistor 11 is in the open state and current cannot flow between the electromagnet 7 and the detection module 10. The receiving port A is then insulated from the electromagnet 7 and the latter is controlled by the control module to carry out an open command or lock command.

With reference to FIG. 6, there is now described an example operation of an opening system, wherein a method for detecting that the opening member has reached the closed position on a frame can be applied.

As can be seen in this FIG. 6, the operation of the opening system begins with a step of checking whether the control module 9 is receiving a control command.

If the control module 9 is receiving such a control command, for example following actuation of the control button 12 by a vehicle occupant or detection of an event by the event detection device 13, the reception by the detection module 10 of the signal representative of the opening member 3 reaching the closed position is prevented by sending no signal to the detection control port B, so that the transistor 11 is in open state and current cannot flow between the electromagnet 7 and the detection module 10.

The electromagnet 7 is then activated to perform the desired function (opening or locking the opening member) by means of a current supplied by the control module 9 to the control port of the electromagnet 7.

A wait step is then executed, in particular to allow time for a vehicle occupant to manually maneuver the opening member 3 in the case of an open command canceling the closure force, or to maintain a locking force reinforcing the closure force for a certain period in the case of a lock command issued upon detection of a vehicle impact.

The electromagnet 7 is then deactivated and the method returns to the step of testing whether the control module 9 is receiving a control command.

If the control module 9 is not receiving a control command, the detection module 10 is activated and the detection module 10 is able to receive the signal representative of the opening member 3 reaching the closed position: a signal iB greater than the predetermined control threshold Sc is sent to the detection control port B, so that the transistor 11 is placed in the on state and current can flow between the electromagnet 7 and the detection module 10.

The current Ci induced in the electromagnet 7 by the magnetic field variation caused by the change of position between the ferromagnetic element 5 and the magnet 6 when the opening member is moved between the open position and the closed position is then received by the receiving port A of the detection module 10.

This induced current Ci is then compared with a predetermined detection threshold Sd, and the detection module 10 detects that the opening member 3 has reached the closed position when the induced current Ci received at the receiving port A reaches this detection threshold Sd.

The detection module 10 then generates information indicating that the opening member 3 is in the closed position on the frame 2; this information may possibly be used at a later time for example to control a device according to the position of the opening member 3 relative to the frame 2 as mentioned above.

The invention claimed is:

1. An opening system for a vehicle, comprising:
    a frame having an opening;
    an opening member that is movable relative to the frame between a closed position where it obstructs the opening of said frame and an open position where it unobstructs the opening of said frame; and
    a retaining device comprising:
        a ferromagnetic element provided on one of the frame and opening member;
        a permanent magnet provided on the other of the frame and opening member and magnetically coupled to the ferromagnetic element when the opening member is in the closed position so as to apply a closure force;
        an electromagnet magnetically coupled to one of the ferromagnetic element and permanent magnet; and
        a control unit comprising a control module electrically coupled to the electromagnet and adapted to activate the electromagnet upon reception of a control command,
    wherein the control unit further comprises a detection module which is activated when the electromagnet is in a passive state,
    wherein the electromagnet is used as a sensor by the detection module when the electromagnet is in the passive state to detect a signal originating from the electromagnet,
    wherein the signal is representative of the opening member approaching the closed position from the open position, and
    wherein the detection module generates information based on the detection of the signal indicating that the opening member has reached the closed position.

2. The opening system according to claim 1, wherein the detection module is adapted to receive a current induced in the electromagnet by the magnetic field variation caused by the change in position between the ferromagnetic element and the permanent magnet when the opening member is moved between the open position and the closed position,
    and wherein the detection module detects a signal representative of the opening member reaching the closed position and generates information indicating that the opening member is in the closed position when said induced current reaches a predetermined detection threshold.

3. The opening system according claim 1, further comprising a switching element electrically connected to the electromagnet and detection module and adapted to adopt an open state in which the electromagnet is electrically insulated from the detection module, upon reception of a control command by the control module, and to adopt an on state in which the electromagnet is electrically connected to the detection module in the absence of a control command being received by the control module.

4. The opening system according to claim 3, wherein the control module comprises a detection control port adapted to send a detection control signal, and the detection module comprises a receiving port for the induced current,
wherein the switching element is electrically connected to the detection control port;
wherein the switching element is adapted to adopt the open state as long as the detection control signal sent to the detection control port is below a predetermined control threshold, and to adopt the on state when the detection control signal sent to the detection control port exceeds said predetermined control threshold,
and wherein the control module sends to the detection control port a detection control signal exceeding the predetermined control threshold in the absence of a control command being received by the control module.

5. The opening system according to claim 4, wherein the switching element comprises an NPN transistor having a base, a collector, and an emitter, said base being connected to the control port, said collector being connected to the electromagnet, and said emitter being connected to the detection port.

6. The opening system according to claim 1, wherein the electromagnet is magnetically coupled to the permanent magnet, and wherein, after receiving an open command, the control module supplies electricity to the electromagnet such that the magnetic field impinging on the ferromagnetic element from the permanent magnet is at least partially cancelled by the magnetic field from the electromagnet, thereby at least partially cancelling the closure force applied to the opening member.

7. The opening system according to claim 1, wherein the electromagnet is magnetically coupled to the ferromagnetic element, and wherein, after receiving an open command, the control module supplies electricity to the electromagnet to magnetically polarize the ferromagnetic element such that an opening force opposing and exceeding the closure force is applied to the opening member.

8. The opening system according to claim 6, further comprising a release control button operable by a vehicle occupant and electrically connected to the control module such that the open command is sent to said control module upon actuation of the release control button by a vehicle occupant.

9. The opening system according to claim 1, wherein, after receiving a lock command, the control module supplies electricity to the electromagnet so as to reinforce the closure force applied to the opening member.

10. The opening system according to claim 9, further comprising an event detection device adapted to detect an event and electrically connected to the control module so that the lock command is sent to said control module upon detection of an event by the event detection device.

11. The opening system according to claim 10, wherein the event detection device comprises a crash sensor, a rain sensor, a light sensor, and/or a proximity sensor.

12. A method for detecting that an opening member has reached the closed position on a frame in an opening system according to claim 1, comprising the following successive steps:
verification of the reception of a control command by the control module of the control unit;
in the absence of a control command being received by the control module, activation of the detection module;
detection of a signal, originating from the electromagnet, representative of the opening member reaching the closed position; and
generation of information indicating that the opening member is in the closed position.

13. The detection method according to claim 12, wherein the step of detection of a signal, originating from the electromagnet, representative of the opening member reaching the closed position comprises the following sub-steps:
reception in the detection module of a current induced in the electromagnet by the magnetic field variation caused by the change in position between the ferromagnetic element and the magnet when the opening member is moved between the open position and the closed position;
comparison of the induced current with a predetermined detection threshold;
detection of a signal representative of the opening member reaching the closed position when the induced current reaches the predetermined detection threshold; and
generation of information indicating that the opening member is in the closed position.

* * * * *